United States Patent
Gu et al.

(10) Patent No.: US 12,189,790 B2
(45) Date of Patent: Jan. 7, 2025

(54) PRIVACY-ENHANCED FEDERATED DECISION-MAKING METHOD, APPARATUS, SYSTEM AND STORAGE MEDIUM

(71) Applicant: Beijing University of Posts and Telecommunications, Beijing (CN)

(72) Inventors: Rentao Gu, Beijing (CN); Haiyu Liu, Beijing (CN); Xiaoya Zhang, Beijing (CN); Yunxuan Li, Beijing (CN); Yuefeng Ji, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 336 days.

(21) Appl. No.: 17/848,420

(22) Filed: Jun. 24, 2022

(65) Prior Publication Data
US 2023/0095905 A1    Mar. 30, 2023

(30) Foreign Application Priority Data

Sep. 28, 2021 (CN) .......................... 202111140252.0

(51) Int. Cl.
*G06F 21/60*     (2013.01)
*G06F 18/214*    (2023.01)

(52) U.S. Cl.
CPC ............ *G06F 21/60* (2013.01); *G06F 18/214* (2023.01)

(58) Field of Classification Search
CPC ...... G06F 18/214; G06F 21/60; G06F 18/217; G06F 21/624
See application file for complete search history.

(56) References Cited

U.S. PATENT DOCUMENTS

| | | | | |
|---|---|---|---|---|
| 11,886,993 | B2* | 1/2024 | Qi | ............................ G06N 3/08 |
| 2012/0166583 | A1* | 6/2012 | Koonce | .................... G06N 5/02 |
| | | | | 709/217 |

(Continued)

FOREIGN PATENT DOCUMENTS

| | | |
|---|---|---|
| CN | 109871702 A | 6/2019 |
| CN | 111477290 A | 7/2020 |

(Continued)

*Primary Examiner* — Gary S Gracia
(74) *Attorney, Agent, or Firm* — Bayramoglu Law Offices LLC

(57) ABSTRACT

A privacy-enhanced federated decision-making method, apparatus, system and a storage medium are provided for training a global decision-making model for ensuring data privacy of data terminals. Each federated data terminal reports information about a local decision-making model to a federated coordinator, and a federated coordinator trains a global decision-making model by using the information about the local decision-making model reported by the federated data terminals. The trained global decision-making model can be used for coordinating decision making of the federated data terminals, such as coordinating a decision-making sequence of the federated data terminals or coordinating whether the federated data terminals need to participate in a decision-making task. The method resolves the problem of difficult coordination across the data terminals, and improves the decision-making accuracy of the data terminals. The federated data terminals adaptively use the federated decision-making model for improving the decision-making flexibility of the federated data terminals.

7 Claims, 3 Drawing Sheets

(56) References Cited

U.S. PATENT DOCUMENTS

| | | | |
|---|---|---|---|
| 2020/0027009 A1* | 1/2020 | Khan | G06N 7/01 |
| 2020/0110982 A1* | 4/2020 | Gou | G06N 3/088 |
| 2020/0293690 A1* | 9/2020 | Ewald | G06F 21/6254 |
| 2021/0042590 A1* | 2/2021 | Watts | G06N 5/045 |
| 2021/0042628 A1* | 2/2021 | Zhou | G06N 3/044 |
| 2021/0103838 A1* | 4/2021 | Yuan | G06F 18/23 |
| 2021/0117395 A1* | 4/2021 | Wang | G06F 21/53 |
| 2021/0142169 A1* | 5/2021 | De | G06N 5/01 |
| 2021/0142253 A1* | 5/2021 | Cohen | G06Q 30/0202 |
| 2022/0158890 A1* | 5/2022 | Karapantelakis | H04L 43/50 |
| 2022/0229904 A1* | 7/2022 | Huang | G06F 21/556 |
| 2022/0327204 A1* | 10/2022 | Abbaszadeh | H04L 63/1408 |
| 2023/0076559 A1* | 3/2023 | Sankarapu | G06Q 40/03 |

FOREIGN PATENT DOCUMENTS

| | | | |
|---|---|---|---|
| CN | 111582504 A | 8/2020 | |
| CN | 111898137 A | 11/2020 | |

* cited by examiner

PRIVACY-ENHANCED FEDERATED DECISION-MAKING METHOD, APPARATUS, SYSTEM AND STORAGE MEDIUM

CROSS REFERENCE TO THE RELATED APPLICATIONS

This application is based upon and claims priority to Chinese Patent Application No. 202111140252.0 filed on Sep. 28, 2021, the entire contents of which are incorporated herein by reference.

TECHNICAL FIELD

The present disclosure relates to the technical field of decision making across data terminals, and particularly, to a privacy-enhanced federated decision-making method, apparatus, system and a storage medium.

BACKGROUND

With the rapid development and promotion of artificial intelligence technologies such as machine learning, more enterprises and scholars try to train models based on a large amount of raw data to obtain higher-fitting models. As the importance of data privacy and security is increasingly recognized worldwide, countries are strengthening the protection of data security and privacy. The European Union's General Data Protection Regulation (GDPR) clearly regulates any organization that collects, transmits, retains, or processes personal information in all EU member states. China also clearly states in many laws and regulations that network operators shall not disclose, tamper with, or destroy collected personal information. These laws and regulations, while safeguarding the security of their citizens' personal information, also bring huge challenges to artificial intelligence developments because the developments of artificial intelligence rely on big data. Under these laws and regulations, data cannot be exchanged between different companies or even between different departments within a company.

In reality, because of the consideration of the privacy and security of raw data, it is extremely hard to integrate data scattered in different locations and different companies. As a result, many enterprises and scholars start focusing on developing a model training method that enables joint model training by multiple parties owning the raw data and also guarantees privacy and security of the raw data.

Conventionally, private data from multiple parties is mainly protected in two methods:

In the first method, a data provider encrypts the data before sending it.

However, sending encrypted data is vulnerable to an encryption cracking technology, which is a threat to the security of private data. In addition, encryption can only prevent eavesdropping by malicious attackers during data transmission, but cannot prevent the collector from illegally using the collected raw data. In view of this, the raw data providers are reluctant to disclose the raw data to the public.

The second method is federated learning. In this method, data of all parties participating in model training is kept locally without privacy leakage or regulation violation. A distributed training method and a system of mutual benefits are used for model training. Currently, there are many studies that use federated learning to implement model training across data terminals. However, existing studies combining federated learning with decision-making models on the premise of protecting the privacy of data terminals are not ideal for decision-making based on the privacy protection of data terminals. Decision making across data terminals on the premise of protecting the information privacy of the data terminals mainly faces two major difficulties: First, coordination for decision-making between the data terminals is difficult due to data privacy within data terminals; second, accurate decision making is difficult for sub-tasks of each data terminal without global information.

SUMMARY

To resolve the above technical problems, the present disclosure provides a privacy-enhanced federated decision-making method, apparatus, system and storage medium, to enable accurate decision making across multiple data terminals while ensuring the privacy and security of the raw data. In view of the difficult decision-making coordination among the data terminals as a result of protecting the privacy of data within data terminals, a global decision-making model is trained by using information about a local decision-making model of each data terminal, to coordinate decision making among the data terminals. In response to the difficulty in accurate decision making by the data terminals, a federated learning architecture is used to train a federated decision-making model, and each data terminal can decide how to use the federated decision-making model based on local demand for guidance from a federated coordinator. The present disclosure not only resolves the problem of difficult coordination across the data terminals, but also improves the decision-making accuracy of the data terminals. The data terminals adaptively use the federated decision-making model, greatly improving the decision-making flexibility of the data terminals.

A privacy-enhanced federated decision-making method, apparatus, system and storage medium are provided.

A privacy-enhanced federated decision-making method is applied to a federated data terminal interacting with a federated coordinator, and includes the following steps:

Step S110: Receive a learning signal.

The federated data terminal receives the learning signal from the federated coordinator and activates local decision making with the received learning signal.

In an example, there are N federated data terminals, and N is a natural number greater than 1.

Further, since the federated data terminal cannot actively participate in a federated decision-making process, the federated coordinator needs to send the learning signal to the federated data terminal, and the federated data terminal participates in the federated decision-making process after receiving the corresponding learning signal, and then activates local decision making.

The learning signal is used to inform the federated data terminal when to participate in the federated decision-making process, and the learning signal is a variable determined by a user according to the actual situation.

Step S120: Make a local decision based on task request information, and calculate and update a parameter of a local decision-making model based on a local decision-making result and a calculation parameter.

The federated data terminal obtains local data and the local decision-making model, and inputs the local data and the current task request information to the local decision-making model, to obtain the local decision-making result.

The calculation parameter and the local decision-making result are substituted into an updated formula of the local decision-making model, to obtain an intermediate result of calculating the parameter of the local decision-making model, and obtain a new parameter of the local decision-making model.

The new parameter of the local decision-making model is substituted into the local decision-making model to update the parameter of the local decision-making model.

Step S130: Report to the federated coordinator the intermediate result of calculating the parameter of the local decision-making model and the updated parameter of the local decision-making model after decision making, where the parameter of the local decision-making model is used by the federated coordinator to update the global decision-making model, and the intermediate result of calculating the parameter of the local decision-making model is used by the federated coordinator to aggregate the new federated decision-making model.

Step S140: Receive coordination information and the federated decision-making model delivered by the federated coordinator.

Step S150: The federated data terminal aggregates the local decision-making model and the federated decision-making model to obtain a terminal decision-making model based on the coordination information sent by the federated coordinator and a local demand for the federated decision-making model, where the terminal decision-making model is used by the federated data terminal for local decision making.

Further, the federated data terminal participates in the task decision-making process based on the coordination information delivered by the federated coordinator, and the federated data terminal decides, based on its own demand for guidance from the federated coordinator on local decision making, whether to use the federated decision-making model delivered by the federated coordinator for local decision making.

Further, whether the federated data terminal reports the intermediate result of calculating the parameter of the local decision-making model to the federated coordinator depends on whether the federated data terminal needs the federated decision-making model for guidance on local decision making and based on a local management policy and a protection degree of the terminal for local privacy.

Whether the federated data terminal needs the federated decision-making model for guidance on local decision making specifically includes three cases:

Case 1: The federated data terminal does not need the federated coordinator to guide local decision making, and the federated data terminal does not report to the federated coordinator the intermediate result of calculating the parameter of the local decision-making model.

In case 1, the federated data terminal does not need the federated coordinator to guide local decision making, and the federated data terminal completely uses the locally trained local decision-making model as the terminal decision-making model for local decision making.

Case 2: The federated data terminal needs the federated coordinator to completely guide local decision making, and the federated data terminal reports all intermediate results of calculating the parameter of the local decision-making model to the federated coordinator.

In case 2, the federated data terminal needs the federated coordinator to completely guide local decision making, and the federated data terminal uses the federated decision-making model as the terminal decision-making model for local decision making.

Case 3: The federated data terminal needs the federated coordinator to partially guide local decision making, and the federated data terminal reports partial intermediate results of calculating the parameter of the local decision-making model to the federated coordinator.

In case 3, the federated data terminal needs the federated coordinator to partially guide local decision making, and the federated data terminal aggregates the federated decision-making model and the local decision-making model to obtain the terminal decision-making model for local decision making.

Step S160: Generate an optimal local decision by using the terminal decision-making model based on the coordination information delivered by the federated coordinator.

A privacy-enhanced federated decision-making apparatus is configured to implement the privacy-enhanced federated decision-making method, including a first terminal sending and receiving module, a local decision-making module, a local calculation module, a local storage module and a second terminal sending and receiving module.

Further, the first terminal sending and receiving module is configured to: interact with a federated coordinator, send to the federated coordinator a parameter of a local decision-making model and an intermediate result of calculating the parameter of the local decision-making model, and receive a learning signal, coordination information and a federated decision-making model delivered by the federated coordinator.

Further, the local decision-making module is configured to: make a local decision for each federated data terminal based on a task characteristic and data in the local storage module, and make a decision based on the local decision-making model after receiving the learning signal that is received and sent by the second terminal sending and receiving module, where a decision-making result enters the local calculation module for further calculation.

Further, the local calculation module is configured to: calculate an updated parameter of the local decision-making model after local decision making based on the decision-making result of the local decision-making module and a calculation parameter received by the first terminal sending and receiving module, store the updated parameter of the local decision-making model and a new intermediate result of calculating the parameter of the local decision-making model in the local storage module, and perform a calculation for aggregating the federated decision-making model and the local decision-making model into a terminal decision-making model.

Further, the local storage module is configured to: store local data, the calculation parameter, the local decision-making model, the terminal decision-making model and the intermediate result of calculating the parameter of the local decision-making model, send the parameter of the local decision-making model and the intermediate result of calculating the parameter of the local decision-making model to the federated coordinator via the first terminal sending and receiving module, and send, when there is a local decision-making task, the local decision-making model and the local data to the local calculation module for local decision making.

Further, the second terminal sending and receiving module is configured to: receive dynamic changes in local resources and data and timely update the latest local data to the local storage module, receive a local decision-making task request, report the local decision-making task request to the federated coordinator via the federated data terminal, and send a terminal decision-making strategy to a specific executor.

A privacy-enhanced federated decision-making system includes the privacy-enhanced federated decision-making apparatus described above.

Another privacy-enhanced federated decision-making method is applied to a federated coordinator interacting with a federated data terminal, and includes the following steps:

Step S210: Send a learning signal to the federated data terminal.

Step S220: The federated coordinator receives information about a local decision-making model and an intermediate result of calculating a parameter of the local decision-making model that is reported by the federated data terminal.

Step S230: Calculate and update a global decision-making model by using the information about the local decision-making model sent by the federated data terminal, and aggregate a new federated decision-making model by using the intermediate result of calculating the parameter of the local decision-making model sent by the federated data terminal.

Further, the global decision-making model is used to coordinate decision making of the federated data terminal, and the global decision-making model is capable of generating information such as whether the federated data terminal participates in the final decision making or the order in which the federated data terminal participates in decision making.

The federated decision-making model is used to guide the federated data terminal in local decision making.

Further, a parameter of the global decision-making model is obtained from a global data memory; an update rule for the global decision-making model is obtained; a parameter of the federated decision-making model is obtained from the global data memory; an aggregation rule for the federated decision-making model is obtained; the parameter of the global decision-making model and the received information about the local decision-making model of the federated data terminal are updated according to the update rule for the global decision-making model; and the parameter of the federated decision-making model and the received intermediate result of calculating the parameter of the local decision-making model of the federated data terminal are aggregated according to the aggregation rule for the federated decision-making model.

Step S240: Determine whether training on the global decision-making model meets a termination condition.

Step S250: Generate, based on the trained global decision-making model, coordination information for coordinating decision making of the federated data terminal, and store the generated coordination information for coordinating decision making of the federated data terminal and the aggregated federated decision-making model in the global storage module and send them to the federated data terminal.

Another privacy-enhanced federated decision-making apparatus is configured to implement the another privacy-enhanced federated decision-making method and includes: a coordinator sending and receiving module, a global storage module, a federated calculation module and a global decision-making module.

Further, the coordinator sending and receiving module is configured to: interact with a federated data terminal, send a learning signal, coordination information and a federated decision-making model to the corresponding federated data terminal, and send, to the federated calculation module, information about a local decision-making model and an intermediate result of calculating a parameter of the local decision-making model that is sent by the federated data terminal, to update a global decision-making model and aggregate the federated decision-making model.

Further, the global storage module is configured to: store the global decision-making model, store a parameter of the global decision-making model integrated by the federated calculation module, and send, after the global decision-making model is trained, the global decision-making model to the global decision-making module to generate the coordination information for coordinating decision making of the federated data terminal.

Further, the federated calculation module is configured to: process the information about the local decision-making model and the intermediate result of calculating the parameter of the local decision-making model, calculate and update the global decision-making model by using the information about the local decision-making model, and aggregate the new federated decision-making model by using the intermediate result of calculating the parameter of the local decision-making model.

Further, after the global decision-making model is trained, the global decision-making module generates, based on the trained global decision-making model, the coordination information for coordinating decision making of the federated data terminal, and stores the coordination information in the global storage module.

Another privacy-enhanced federated decision-making system includes the another privacy-enhanced federated decision-making apparatus.

Still another privacy-enhanced federated decision-making method is applied to the interaction between a federated data terminal and a federated coordinator, and specifically includes the following steps:

Step 1: The federated coordinator sends a learning signal to the federated data terminal based on decision-making task request information, and the federated data terminal receives the learning signal and makes a local decision based on a decision-making task characteristic.

Step 2: The federated data terminal calculates and updates information about a local decision-making model based on a local decision-making result, and reports to the federated coordinator the updated information about the local decision-making model and an intermediate result of calculating a parameter of the local decision-making model.

Step 3: The federated coordinator calculates and updates a global decision-making model by using the information about the local decision-making model, and aggregates a new federated decision-making model by using the intermediate result of calculating the parameter of the local decision-making model.

Step 4: The federated coordinator determines whether a training termination condition is met; and if yes, the federated coordinator generates, based on the trained global decision-making model, coordination information for coordinating decision making of the federated data terminal, and proceeds to the next step; or if not, continues training.

Step 5: The federated coordinator stores the aggregated federated decision-making model and the generated coordination information for coordinating decision making of the federated data terminal to a global storage module, and sends the aggregated federated decision-making model and the generated coordination information to the federated data terminal; and the federated data terminal generates a terminal decision-making model by using the local decision-making model and the federated decision-making model based on the coordination information delivered by the federated coordinator, where the terminal decision-making model is used for local decision making to generate an optimal local decision.

Still another privacy-enhanced federated decision-making apparatus implements another privacy-enhanced federated decision-making method and includes: a first terminal sending and receiving module, a local decision-making module, a local calculation module, a local storage module, a second terminal sending and receiving module, a coordinator sending and receiving module, a global storage module, a federated calculation module, and a global decision-making module.

Still another privacy-enhanced federated decision-making system includes another privacy-enhanced federated decision-making apparatus.

A computer storage medium stores a computer-executable program for executing the privacy-enhanced federated decision-making method, the another privacy-enhanced federated decision-making method, and the still another privacy-enhanced federated decision-making method.

Beneficial Effects:

1. The privacy-enhanced federated decision-making system according to the present disclosure completes training of the global decision-making model, the local decision-making model and the federated decision-making model in one training session, greatly improving the training accuracy. During the training process, according to whether the federated data terminal needs the federated decision-making model for guidance on local decision making, the local management policy and the protection degree of the terminal for local privacy, the federated data terminal autonomously decides whether to report to the federated coordinator the intermediate result of calculating the parameter of the local decision-making model and whether to train and use the federated decision-making model, such that the federated coordinator guides decision making of the terminal, which greatly increases the flexibility of model training and use.

2. The method according to the present disclosure uses the idea of federation and distributed computing to jointly generate a task decision through the cooperation of multiple data terminals participating in model training, and continuously improves the model accuracy with the progressive optimization characteristics of the decision-making model. The data terminals make distributed local decisions and the coordinator performs global coordination and policy generation. The difficulty in centralized training of the decision-making model on the premise of ensuring the local data privacy of the data terminals is solved.

3. The method according to the present disclosure can realize task decision making across the data terminals while ensuring the privacy of the raw data of the data terminals. The raw data does not need to be sent, only model information is exchanged between the data terminals and the coordinator. This not only enhances the privacy of the raw data but also reduces the amount of exchanged information during communication.

4. The privacy-enhanced federated decision-making system according to the present disclosure ensures orderly interaction between the federated data terminals and the federated coordinator.

DETAILED DESCRIPTION OF THE EMBODIMENTS

Figure 1:
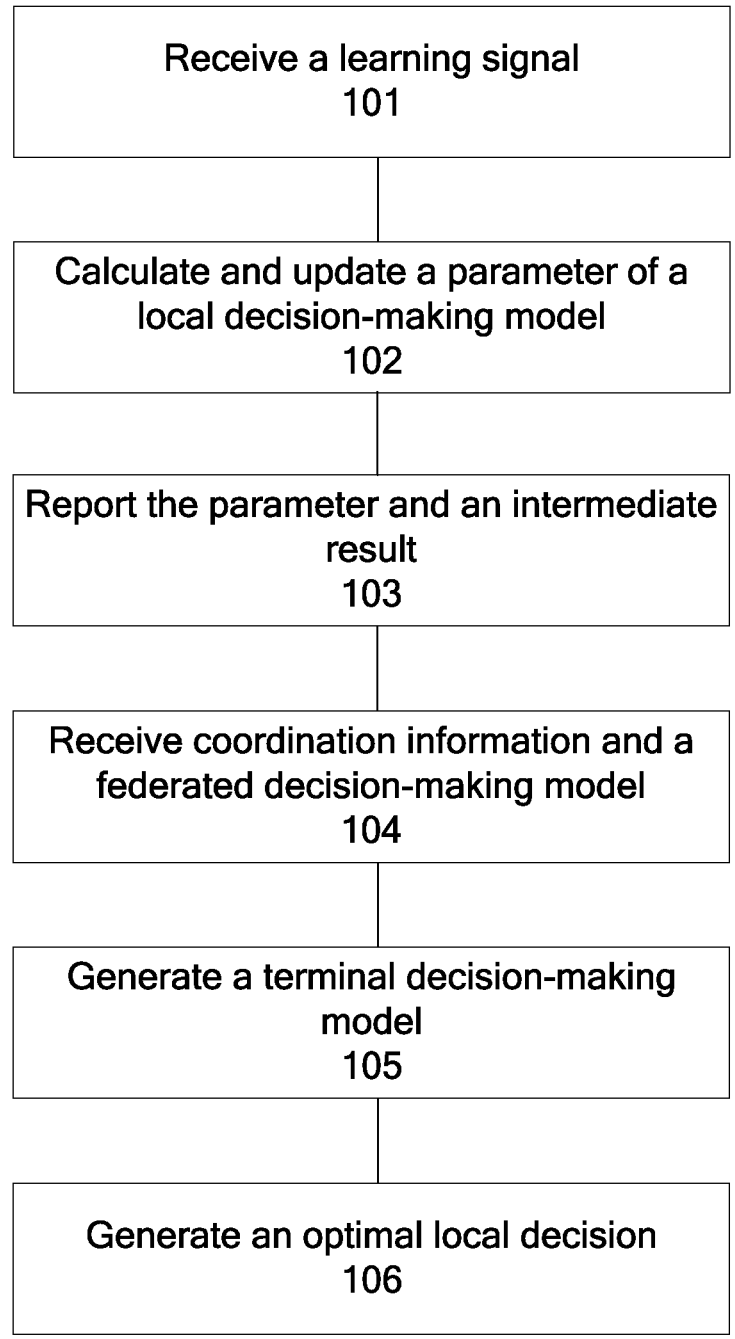
FIG. 1 is a schematic flowchart of a privacy-enhanced federated decision-making method according to the present disclosure.
Figure 2:
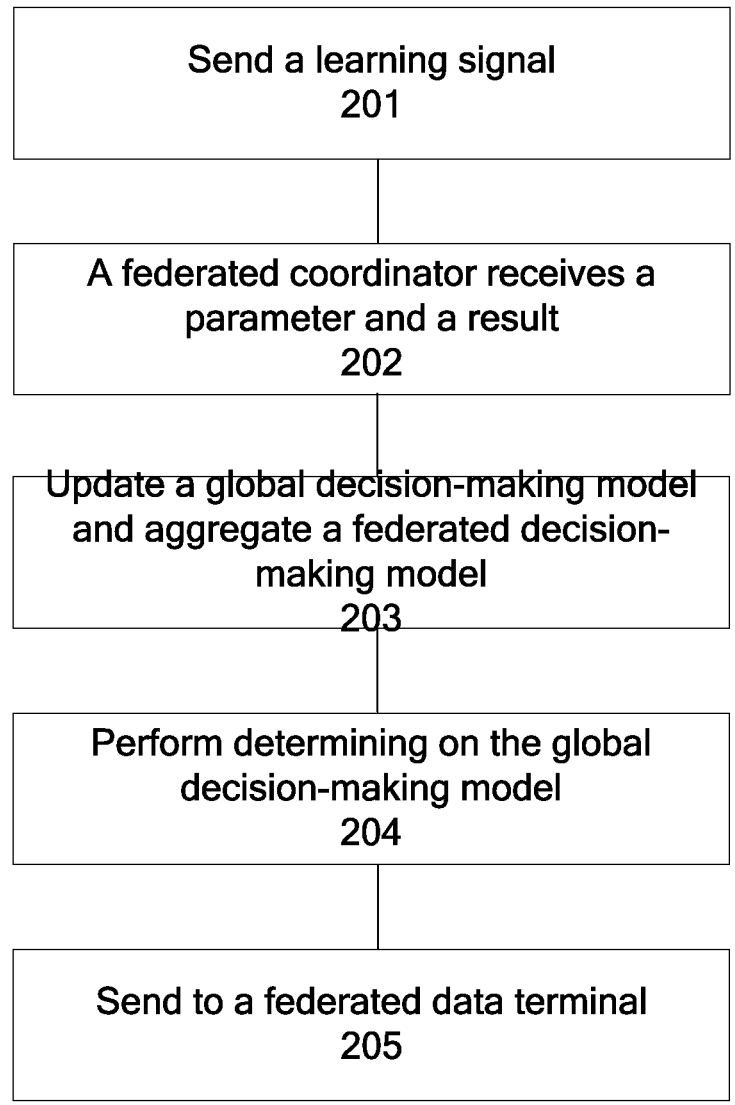
FIG. 2 is a schematic flowchart of another privacy-enhanced federated decision-making method according to the present disclosure.
Figure 3:
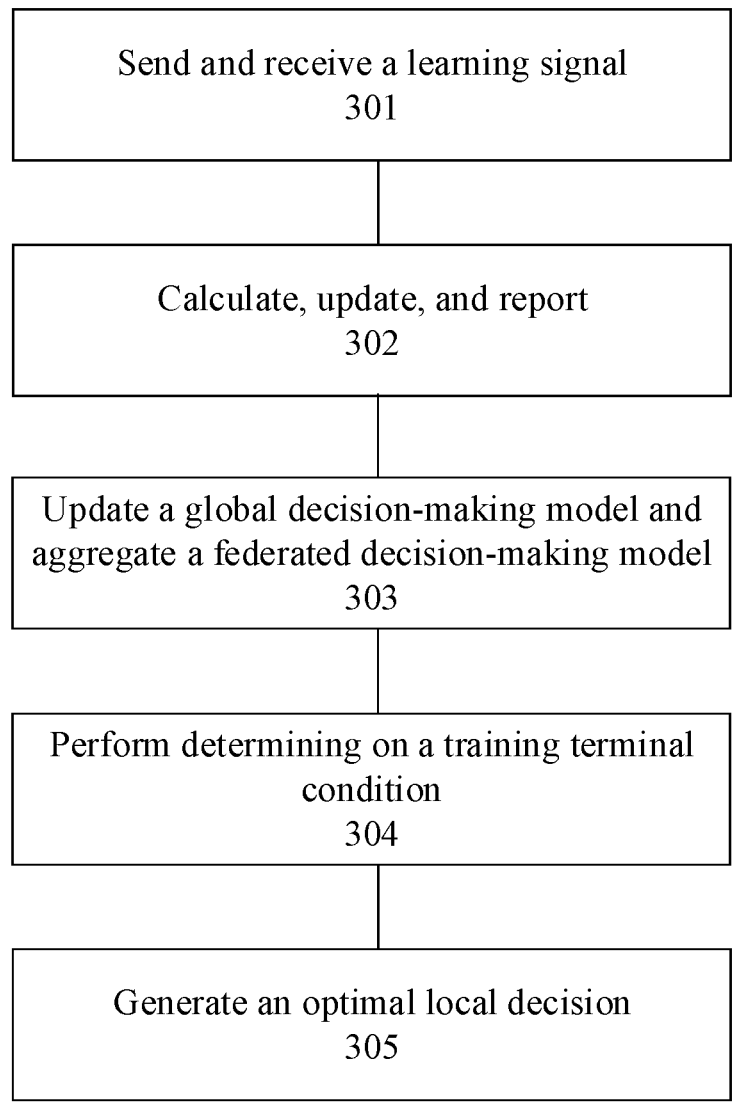
FIG. 3 is a schematic flowchart of still another privacy-enhanced federated decision-making method according to the present disclosure.

A privacy-enhanced federated decision-making method, apparatus, system and a storage medium are described below with reference to FIG. 1 to FIG. 3.

A privacy-enhanced federated decision-making method is applied to a federated data terminal interacting with a federated coordinator, and includes the following steps:

Step S110: Receive a learning signal 101.

The federated data terminal receives the learning signal from the federated coordinator and activates local decision making with the received learning signal.

In an example, there are N federated data terminals, and N is a natural number greater than 1.

Further, since the federated data terminal cannot actively participate in a federated decision-making process, the federated coordinator needs to send the learning signal to the federated data terminal, and the federated data terminal participates in the federated decision-making process after receiving the corresponding learning signal, and then activates local decision making.

The learning signal is used to inform the federated data terminal when to participate in the federated decision-making process, and the learning signal is a variable determined by a user according to the actual situation.

In an example, the learning signal is a Boolean variable indicating whether to start learning. When flag=1, it indicates to activate local decision making; or when flag=0, it indicates that local decision making does not need to be activated currently.

In an application example, if the learning signal sent by the federated coordinator to a federated data terminal is 1, the federated data terminal starts local decision making; or if the learning signal sent by the federated coordinator to a federated data terminal is 0, the federated data terminal does not perform any action.

In an example, the learning signal may alternatively be a numerical variable, such as a number of the federated data terminal. When the federated coordinator broadcasts a number of a federated data terminal that needs to make a decision, only the federated data terminal whose data terminal number matches the broadcast number activates local decision making.

In an application example, the current broadcast indicates a federated data terminal 3 to make a local decision, only the federated data terminal 3 activates local decision making after receiving the learning signal, while other federated data terminals, such as a federated data terminal 1, receive the learning signal and find that the data terminal that should perform learning is not themselves, and then discard the learning signal.

In an example, the federated data terminal receives the learning signal through direct serial communications, or through a wireless network or a wired network.

Step S120: Make a local decision based on task request information, and calculate and update a parameter of a local decision-making model based on a local decision-making result and a calculation parameter 102.

The federated data terminal obtains local data and the local decision-making model, and inputs the local data and the current task request information to the local decision-making model, and then obtains the local decision-making result.

The calculation parameter and the local decision-making result are substituted into an update formula of the local decision-making model, to obtain an intermediate result of calculating the parameter of the local decision-making model, and obtain a new parameter of the local decision-making model.

The new parameter of the local decision-making model is substituted into the local decision-making model to update the parameter of the local decision-making model.

In an example, the local data is data used by the federated data terminal for local decision making, including one or a combination of: an urban traffic road map, a real-time urban road flow, a network topology, and a path bandwidth.

In an example, the task request information is task request information across federated data terminals, including: a start state, an end state and some constraints of the task request; and the constraints include constraints on latency and a frequency gap of the bandwidth occupied by the task request in the communication network (such as the IP network or the optical network).

The task should be a decision-making task, which may specifically be shortest path planning or optimal routing in the communication network (such as the IP network or the optical network); and the task characteristic may be the start state and the end state of the task (such as the starting and ending points of the path), the constraints (such as the bandwidth to be occupied by the service and the maximum acceptable time of the path), and the desired effect. The desired effect may be that the planned path is shortest, the planned path has the least cost and the shortest time, or the routing path occupies the fewest network resources and has the lowest latency.

In an example, the local decision-making model is used by the federated data terminal for local decision making based on the local data in the training process, and different decision-making models are selected for different decision-making problems and different problem magnitudes.

In an application example, the decision-making model includes reinforcement learning and deep reinforcement learning decision-making models such as Q-learning and Deep Q-Network (DQN).

In an example, local decision making refers to a current decision-making result within the federated data terminal; and the decision-making result includes a routing path within the federated data terminal, that is, a shortest path between a point B and a point A.

In an example, the calculation parameter depends on the local decision-making model used for decision making, and different local decision-making models correspond to different model update methods, and correspond to different calculation parameters. If DQN is used as the decision-making model, the calculation parameter is a parameter (such as a weight or a gradient value) used for the update calculation of the neural network. If Q-learning is used as the decision-making model, the calculation parameter is a parameter for calculating the Q-value, such as a decay rate or a discount rate.

In an example, the local decision-making result is a decision made by the federated data terminal based on a terminal decision-making model, for example, a planned path or an optimal routing policy for the current federated data terminal during path planning and route planning.

During routing for multiple federated data terminals, the local decision-making result of each federated data terminal indicates a routing path within the federated data terminal from a starting position to an outlet of the federated data terminal; and the routing path is obtained through the local decision-making model of the federated data terminal.

In an example, the parameter of the local decision-making model is used for the decision-making model, for example, the reinforcement learning and deep reinforcement learning decision-making models such as Q-learning and DQN, are used by the federated data terminal for decision making. If DQN is used, the parameter of the local decision-making model is a neural network parameter in DQN, including information such as the number of layers of the neural network of DQN, the connection relationship between neurons, the offset and the weight. If Q-learning is used, the calculation parameter may be the update of the Q-value corresponding to the state or action of the local decision in Q-learning.

In an example, the updated formula of the local decision-making model is used for the calculation of a new parameter of the local decision-making model, including the updated formula of the decision-making model such as Q-learning or DQN.

Step S130: Report to the federated coordinator the intermediate result of calculating the parameter of the local decision-making model and the updated parameter of the local decision-making model after decision making, where the parameter of the local decision-making model is used by the federated coordinator to update the global decision-making model, and the intermediate result of calculating the parameter of the local decision-making model is used by the federated coordinator to aggregate the new federated decision-making model 103.

In an example, the intermediate result of calculating the parameter of the local decision-making model is an intermediate result that assists the update formula of the local decision-making model for calculation, for example, gradient information of the neural network during the calculation of the DRL model of DQN.

In an example, the method for reporting includes: reporting through serial communication, or reporting through a wireless network or a wired network.

Step S140: Receive coordination information and the federated decision-making model delivered by the federated coordinator 104.

In an example, the coordination information is used for coordinating decision making between the federated data terminals, and may be coordination information such as the decision-making sequence of the federated data terminals or which data terminals need to participate in task decision-making.

In an example, the method for delivering includes: delivering through serial communication, or delivering through a wireless network or a wired network.

Step S150: The federated data terminal aggregates the local decision-making model and the federated decision-making model to obtain a terminal decision-making model based on the coordination information sent by the federated coordinator and a local demand for the federated decision-making model, where the terminal decision-making model is used by the federated data terminal for local decision making and generating an optimal local decision 105.

Further, the federated data terminal participates in the task decision-making process based on the coordination information delivered by the federated coordinator, and the federated data terminal decides, based on its own demand for guidance from the federated coordinator on local decision making, whether to use the federated decision-making model delivered by the federated coordinator for local decision making.

In an example, the intermediate result of calculating the parameter of the local decision-making model is used by the federated coordinator to aggregate the new federated decision-making model.

Further, whether the federated data terminal reports the intermediate result of calculating the parameter of the local decision-making model to the federated coordinator depends on whether the federated data terminal needs the federated decision-making model for guidance on local decision making and based on a local management policy and a protection degree of the terminal for local privacy.

Further, whether the federated data terminal needs the federated decision-making model for guidance on local decision making specifically includes three cases:

Case 1: The federated data terminal does not need the federated coordinator to guide local decision making, and the federated data terminal does not report to the federated coordinator the intermediate result of calculating the parameter of the local decision-making model.

In case 1, the federated data terminal does not need the federated coordinator to guide local decision making, and the federated data terminal completely uses the locally trained local decision-making model as the terminal decision-making model for local decision making.

Case 2: The federated data terminal needs the federated coordinator to completely guide local decision making, and the federated data terminal reports all intermediate results of calculating the parameter of the local decision-making model to the federated coordinator.

In case 2, the federated data terminal needs the federated coordinator to completely guide local decision making, and the federated data terminal uses the federated decision-making model as the terminal decision-making model for local decision making.

Case 3: The federated data terminal needs the federated coordinator to partially guide local decision making, and the federated data terminal reports partial intermediate results of calculating the parameter of the local decision-making model to the federated coordinator.

In case 3, the federated data terminal needs the federated coordinator to partially guide local decision making, and the federated data terminal aggregates the federated decision-making model and the local decision-making model to obtain the terminal decision-making model for local decision making.

Step S160: Generate an optimal local decision by using the terminal decision-making model based on the coordination information delivered by the federated coordinator 106.

A privacy-enhanced federated decision-making apparatus is configured to implement the privacy-enhanced federated decision-making method and includes a first terminal sending and receiving module, a local decision-making module, a local calculation module, a local storage module and a second terminal sending and receiving module.

Further, the first terminal sending and receiving module is configured to: interact with a federated coordinator, send to the federated coordinator a parameter of a local decision-making model and an intermediate result of calculating the parameter of the local decision-making model, and receive a learning signal, coordination information and a federated decision-making model delivered by the federated coordinator.

Further, the local decision-making module is configured to: make a local decision for each federated data terminal based on a task characteristic and data in the local storage module, make a decision based on the local decision-making model after receiving the learning signal that is received and sent by the second terminal sending and receiving module, and transmit a decision-making result to the local calculation module for further calculation.

In an example, the federated data terminal is configured to realize communication across data terminals.

Further, the local calculation module is configured to: calculate an updated parameter of the local decision-making model after local decision making based on the decision-making result of the local decision-making module and a calculation parameter received by the first terminal sending and receiving module, store the updated parameter of the local decision-making model and a new intermediate result of calculating the parameter of the local decision-making model in the local storage module, and perform the calculation for aggregating the federated decision-making model and the local decision-making model into a terminal decision-making model.

Further, the local storage module is configured to: store local data, the calculation parameter, the local decision-making model, the terminal decision-making model and the intermediate result of calculating the parameter of the local decision-making model, send the parameter of the local decision-making model and the intermediate result of calculating the parameter of the local decision-making model to the federated coordinator via the first terminal sending and receiving module, and send, when there is a local decision-making task, the local decision-making model and the local data to the local calculation module for local decision making.

Further, the second terminal sending and receiving module is configured to: receive dynamic changes in local resources and data and timely update the latest local data to the local storage module, receive a local decision-making task request, report the local decision-making task request to the federated coordinator via the federated data terminal, and send a terminal decision-making strategy to a specific executor.

A privacy-enhanced federated decision-making system includes the privacy-enhanced federated decision-making apparatus described above.

Another privacy-enhanced federated decision-making method is applied to a federated coordinator interacting with a federated data terminal, and includes the following steps:

Step S210: Send a learning signal to the federated data terminal 201.

Step S220: The federated coordinator receives information about a local decision-making model and an intermediate result of calculating a parameter of the local decision-making model reported by the federated data terminal 202.

Step S230: Calculate and update a global decision-making model by using the information about the local decision-making model sent by the federated data terminal, and aggregate a new federated decision-making model by using the intermediate result of calculating the parameter of the local decision-making model sent by the federated data terminal 203.

Further, the global decision-making model is used to coordinate decision making of the federated data terminal, and the global decision-making model is capable of generating information such as whether the federated data terminal participates in final decision making or the order in which the federated data terminal participates in decision making.

The federated decision-making model is used to guide the federated data terminal in local decision making.

Further, a parameter of the global decision-making model is obtained from a global data memory; an update rule for the global decision-making model is obtained; a parameter of the federated decision-making model is obtained from the global data memory; an aggregation rule for the federated decision-making model is obtained; the parameter of the global decision-making model and the received information about the local decision-making model of the federated data terminal are updated according to the update rule for the global decision-making model; and the parameter of the federated decision-making model and the received intermediate result of calculating the parameter of the local decision-making model of the federated data terminal are aggregated according to the aggregation rule for the federated decision-making model.

Step S240: Determine whether training on the global decision-making model meets the termination condition 204.

Step S250: Generate, based on the trained global decision-making model, coordination information for coordinating decision making of the federated data terminal, and store the generated coordination information for coordinating decision-making of the federated data terminal and the aggregated federated decision-making model in the global storage module and send them to the federated data terminal 205.

Further, that the federated coordinator aggregates the new federated decision-making model by using the intermediate result of the parameter of the local decision-making model sent by the federated data terminal specifically including three cases:

Case 1: The federated data terminal does not need the federated coordinator to guide local decision making, and the federated data terminal does not report to the federated coordinator the intermediate result of calculating the parameter of the local decision-making model.

In case 1, the federated coordinator does not receive the intermediate result of calculating the parameter of the local decision-making model reported by the federated data terminal, the federated coordinator does not aggregate the new federated decision-making model, and the federated coordinator does not send the federated decision-making model to the federated data terminal after the training is completed.

Case 2: The federated data terminal needs the federated coordinator to completely guide local decision making, and the federated data terminal reports all intermediate results of calculating the parameter of the local decision-making model to the federated coordinator.

In case 2, the federated coordinator receives the intermediate results of calculating the parameter of the local decision-making model reported by the federated data terminal; the federated coordinator aggregates the new federated decision-making model based on the intermediate results of calculating the parameter of the local decision-making model reported by the federated data terminal; and the federated coordinator sends, after the training is completed, the aggregated federated decision-making model to the federated data terminal, to guide the federated data terminal in local decision making.

Case 3: The federated data terminal needs the federated coordinator to partially guide local decision making, and the federated data terminal reports partial intermediate results of calculating the parameter of the local decision-making model to the federated coordinator.

In case 3, the federated coordinator receives the partial intermediate results of calculating the parameter of the local decision-making model reported by the federated data terminal; the federated coordinator aggregates the new federated decision-making model based on the partial intermediate results of calculating the parameter of the local decision-making model reported by the federated data terminal; and the federated coordinator sends, after the training is completed, the aggregated federated decision-making model to the federated data terminal, to guide the federated data terminal in local decision making.

Another privacy-enhanced federated decision-making apparatus is configured to implement another privacy-enhanced federated decision-making method and includes: a coordinator sending and receiving module, a global storage module, a federated calculation module and a global decision-making module.

Further, the coordinator sending and receiving module is configured to: interact with a federated data terminal, send a learning signal, coordination information and a federated decision-making model to the corresponding federated data terminal, and send, to the federated calculation module, information about a local decision-making model and an intermediate result of calculating a parameter of the local decision-making model that is sent by the federated data terminal, to update a global decision-making model and aggregate the federated decision-making model.

Further, the global storage module is configured to: store the global decision-making model, store a parameter of the global decision-making model integrated by the federated calculation module, and send, after the global decision-making model is trained, the global decision-making model to the global decision-making module to generate the coordination information for coordinating decision making of the federated data terminal.

Further, the federated calculation module is configured to: process the information about the local decision-making model and the intermediate result of calculating the parameter of the local decision-making model, calculate and update the global decision-making model by using the information about the local decision-making model, and aggregate the new federated decision-making model by using the intermediate result of calculating the parameter of the local decision-making model.

Further, after the global decision-making model is trained, the global decision-making module generates, based on the trained global decision-making model, the coordination information for coordinating decision making of the federated data terminal, and stores the coordination information in the global storage module.

Another privacy-enhanced federated decision-making system includes another privacy-enhanced federated decision-making apparatus.

Still another privacy-enhanced federated decision-making method is applied to the interaction between a federated data terminal and a federated coordinator, and specifically includes the following steps:

Step 1: The federated coordinator sends a learning signal to the federated data terminal based on decision-making task request information, and the federated data terminal receives the learning signal and makes a local decision based on a decision-making task characteristic 301.

Step 2: The federated data terminal calculates and updates a parameter of a local decision-making model based on a local decision-making result, and reports updated information about the local decision-making model and an intermediate result of calculating the parameter of the local decision-making model to the federated coordinator 302.

Step 3: The federated coordinator calculates and updates a global decision-making model by using the information about the local decision-making model, and aggregates a new federated decision-making model by using the intermediate result of calculating the parameter of the local decision-making model 303.

Step 4: The federated coordinator determines whether a training termination condition is met; and if yes, the federated coordinator generates, based on the trained global decision-making model, coordination information for coordinating decision making of the federated data terminal, and proceeds to a next step; or if not, continues training 304.

Step 5: The federated coordinator stores the aggregated federated decision-making model and the generated coordination information for coordinating decision making of the federated data terminal in a global storage module, and sends the aggregated federated decision-making model and the generated coordination information to the federated data terminal; and the federated data terminal generates a terminal decision-making model by using the local decision-making model and the federated decision-making model based on the coordination information delivered by the federated coordinator, where the terminal decision-making model is used for local decision making to generate an optimal local decision 305.

Further, the aggregating, by the federated coordinator depending on whether the federated data terminal needs the federated decision-making model to guide local decision making, the new federated decision-making model by using the intermediate result of calculating the parameter of the local decision-making model reported by the federated data terminal specifically includes three cases:

Case 1: When the federated data terminal does not need the federated coordinator to guide local decision making, the federated data terminal does not report the intermediate result of calculating the parameter of the local decision-making model to the federated coordinator; the federated coordinator does not receive the intermediate result of calculating the parameter of the local decision-making model reported by the federated data terminal; the federated coordinator does not aggregate the new federated decision-making model; and after the training is completed, the federated coordinator does not send the federated decision-making model to the federated data terminal.

Case 2: When the federated data terminal needs the federated coordinator to completely guide local decision making, the federated data terminal reports to the federated coordinator, all intermediate results of calculating the parameter of the local decision-making model; the federated coordinator receives the intermediate results of calculating the parameter of the local decision-making model reported by the federated data terminal; the federated coordinator aggregates the new federated decision-making model based on the intermediate results of calculating the parameter of the local decision-making model reported by the federated data terminal; and the federated coordinator sends, after the training is completed, the aggregated federated decision-making model to the federated data terminal, to guide the federated data terminal in local decision making.

Case 3: When the federated data terminal needs the federated coordinator to partially guide local decision making, the federated data terminal reports to the federated coordinator, partial intermediate results of calculating the parameter of the local decision-making model; the federated coordinator receives the partial intermediate results of calculating the parameter of the local decision-making model reported by the federated data terminal; the federated coordinator aggregates the new federated decision-making model based on the partial intermediate results of calculating the parameter of the local decision-making model reported by the federated data terminal; and the federated coordinator sends, after the training is completed, the aggregated federated decision-making model to the federated data terminal, to guide the federated data terminal in local decision making.

Still another privacy-enhanced federated decision-making apparatus implements the still another privacy-enhanced federated decision-making method and includes: a first terminal sending and receiving module, a local decision-making module, a local calculation module, a local storage module, a second terminal sending and receiving module, a coordinator sending and receiving module, a global storage module, a federated calculation module and a global decision-making module.

Still another privacy-enhanced federated decision-making system includes the still another privacy-enhanced federated decision-making apparatus.

A computer storage medium stores a computer-executable program for executing the privacy-enhanced federated decision-making method, the another privacy-enhanced federated decision-making method, and the still another privacy-enhanced federated decision-making method.

For example, the computer storage medium is one or any combination of a magnetic disk, an optical disk, a read-only memory (ROM), a random access memory (RAM), a flash memory, a hard disk drive (HDD), a solid-state drive (SSD), or the like.

The privacy-enhanced federated decision-making system according to the present disclosure completes training of the global decision-making model, the local decision-making model and the federated decision-making model in one training, greatly improving the training accuracy. During the training process, according to whether the federated data terminal needs the federated decision-making model for guidance on local decision making and based on the local management policy and the protection degree of the terminal for local privacy, the federated data terminal autonomously decides whether to report to the federated coordinator the intermediate result of calculating the parameter of the local decision-making model and whether to train and use the federated decision-making model, such that the federated coordinator guides decision making of the terminal, which greatly increases the flexibility of model training and use.

The method according to the present disclosure uses the idea of federation and distributed calculation to jointly generate a task decision through the cooperation of multiple data terminals participating in model training, and continuously improves the model accuracy with the progressive optimization characteristics of the decision-making model. The data terminals make distributed local decisions and the coordinator performs global coordination and policy generation. The difficulty in centralized training of the decision-making model on the premise of ensuring the local data privacy of the data terminals is solved.

The method according to the present disclosure can realize task decision making across the data terminals while ensuring the privacy of the raw data of the data terminals. The raw data does not need to be sent, only model information is exchanged between the data terminals and the coordinator. This not only enhances the privacy of the raw data but also reduces the amount of exchanged information during communication.

The privacy-enhanced federated decision-making system according to the present disclosure ensures orderly interaction between the federated data terminals and the federated coordinator.

The above disclosed are merely two specific examples of the present disclosure, and the examples of the present disclosure are not limited thereto. Any changes that can be conceived by those skilled in the art should fall within the protection scope of the present disclosure.

What is claimed is:

1. A privacy-enhanced federated decision-making method for an interaction between a federated data terminal and a federated coordinator, comprising:

step 1: sending, by the federated coordinator, a learning signal to the federated data terminal based on decision-making task request information, and receiving, by the federated data terminal, the learning signal and making a local decision based on a decision-making task characteristic;

step 2: calculating and updating, by the federated data terminal, information about a local decision-making model based on the local decision-making result, to obtain the updated information about the local decision-making model and implement reporting of the updated information about the local decision-making model and an intermediate result of calculating a parameter of the local decision-making model to the federated coordinator, wherein the updated information includes an update of the parameter and the updated parameter comprises at least one of a number of layers of a neural network implementing the local decision-making model, a connection between neurons of the neural network, or a weight or gradient value of the neural network, and wherein the reporting comprises determining whether to report the updated information to the federated coordinator based on a protection degree of the federated data terminal for local privacy;

step 3: calculating and updating, by the federated coordinator, a global decision-making model by using the updated information about the local decision-making model, and aggregating a new federated decision-making model by using the intermediate result of calculating the parameter of the local decision-making model;

step 4: determining, by the federated coordinator, whether a training termination condition is met; when the training termination condition is met, generating, by the federated coordinator based on the trained global decision-making model, coordination information for coordinating decision making of the federated data terminal; when the training termination condition is not met, return to step 1; and step 5: storing, by the federated coordinator, the new federated decision-making model and the coordination information for coordinating the decision-making of the federated data terminal to a global storage module, and sending the new federated decision-making model and the coordination information to the federated data terminal; and generating, by the federated data terminal, a terminal decision-making model by combining the local decision-making model and the new federated decision-making model based on the coordination information delivered by the federated coordinator and whether the new federated decision-making model is needed to guide local decision-making, wherein the terminal decision-making model is used for the local decision-making to generate an optimal local decision based on the combined local decision-making model and new federated decision-making model.

2. The privacy-enhanced federated decision-making method according to claim 1, wherein the aggregating of the new federated decision-making model is based on whether the federated data terminal needs the federated decision-making model to guide the local decision making; the federated coordinator aggregates the new federated decision-making model by using the intermediate result of calculating the parameter of the local decision-making model reported by the federated data terminal, and the aggregating of the new federated decision-making model comprises three cases:

case 1: when the federated data terminal does not need the federated coordinator to guide the local decision-making, skipping, by the federated data terminal, reporting the intermediate result of calculating the parameter of the local decision-making model to the federated coordinator; skipping, by the federated coordinator, receiving the intermediate result of calculating the parameter of the local decision-making model reported by the federated data terminal; skipping, by the federated coordinator, aggregating the new federated decision-making model; and after the training is completed, skipping, by the federated coordinator, sending the federated decision-making model to the federated data terminal;

case 2: when the federated data terminal needs the federated coordinator to completely guide the local decision-making, reporting, by the federated data terminal, all information in the intermediate result of calculating the parameter of the local decision-making model to the federated coordinator; receiving, by the federated coordinator, the all information in the intermediate result of calculating the parameter of the local decision-making model reported by the federated data terminal; aggregating, by the federated coordinator, the new federated decision-making model based on the all information in the intermediate result of calculating the parameter of the local decision-making model reported by the federated data terminal; and after the training is completed, sending, by the federated coordinator, the new federated decision-making model to the federated data terminal, wherein the new federated decision-making model is configured for guiding the federated data terminal in the local decision making; and case 3: when the federated data terminal needs the federated coordinator to partially guide the local decision making, reporting, by the federated data terminal, partial information of the intermediate result of calculating the parameter of the local decision-making model to the federated coordinator; receiving, by the federated coordinator, the partial information of the intermediate result of calculating the parameter of the local decision-making model reported by the federated data terminal; aggregating, by the federated coordinator, the new federated decision-making model based on the partial information of the intermediate result of calculating the parameter of the local decision-making model reported by the federated data terminal; and after the training is completed, sending, by the federated coordinator, the new federated decision-making model to the federated data terminal, wherein the new federated decision-making model is configured for guiding the federated data terminal in the local decision making.

3. A privacy-enhanced federated decision-making apparatus implementing the privacy-enhanced federated decision-making method according to claim 1, comprises:
a first terminal sending and receiving module, a local decision-making module, a local calculation module, a local storage module, a second terminal sending and receiving module, a coordinator sending and receiving module, a global storage module, a federated calculation module, and a global decision-making module.

4. The privacy-enhanced federated decision-making apparatus according to claim 3, wherein the first terminal sending and receiving module is configured to interact with the federated coordinator, send the parameter of the local decision-making model and the intermediate result of calculating the parameter of the local decision-making model to the federated coordinator, and receive the learning signal, the coordination information, and the federated decision-making model delivered by the federated coordinator;
the local decision-making module is configured to make the local decision for each federated data terminal based on the decision-making task characteristic and data in the local storage module, make a decision based on the local decision-making model after receiving the learning signal received and sent by the second terminal sending and receiving module, and transmit a decision-making result to the local calculation module for further calculation;
the local calculation module is configured to calculate the updated parameter of the local decision-making model after local decision making based on the decision-making result of the local decision-making module and a calculation parameter received by the first terminal sending and receiving module, store the updated parameter of the local decision-making model and a new intermediate result of calculating the updated parameter of the local decision-making model in the local storage module, and perform a calculation for aggregating the federated decision-making model and the local decision-making model into the terminal decision-making model;
the local storage module is configured to store local data, the calculation parameter, the local decision-making model, the terminal decision-making model, and the new intermediate result of calculating the updated parameter of the local decision-making model, send the updated parameter of the local decision-making model and the new intermediate result of calculating the updated parameter of the local decision-making model to the federated coordinator via the first terminal sending and receiving module, and send, when there is a local decision-making task, the local decision-making model and the local data to the local calculation module for the local decision making; and the second terminal sending and receiving module is configured to receive dynamic changes in local resources and data, update the latest local data to the local storage module, receive a local decision-making task request, report the local decision-making task request to the federated coordinator via the federated data terminal, and send a terminal decision-making strategy to a specific executor.

5. The privacy-enhanced federated decision-making apparatus according to claim 3, wherein the coordinator sending and receiving module is configured to interact with the federated data terminal, send the learning signal, the coordination information, and the federated decision-making model to the corresponding federated data terminal, and send the information about the local decision-making model and the intermediate result of calculating the parameter of the local decision-making model to the federated calculation module for updating a global decision-making model and aggregate the federated decision-making model, wherein the information about the local decision-making model and the intermediate result of calculating the parameter of the local decision-making model is sent by the federated data terminal;
the global storage module is configured to store the global decision-making model, store the parameter of the global decision-making model integrated by the federated calculation module, and send, after the global decision-making model is trained, the global decision-making model to the global decision-making module to generate the coordination information for coordinating decision making of the federated data terminal;
the federated calculation module is configured to process the information about the local decision-making model and the intermediate result of calculating the parameter of the local decision-making model, calculate and update the global decision-making model by using the information about the local decision-making model, and aggregate the new federated decision-making model by using the intermediate result of calculating the parameter of the local decision-making model; and
after the global decision-making model is trained, the global decision-making module generates, based on the trained global decision-making model, the coordination information for coordinating the decision making of the federated data terminal and stores the coordination information in the global storage module.

6. A privacy-enhanced federated decision-making system comprises the privacy-enhanced federated decision-making apparatus according to claim 3.

7. The privacy-enhanced federated decision-making method according to claim 1,
wherein the learning signal comprises a Boolean variable or a numerical variable.

* * * * *